United States Patent [19]

Fujii

[11] Patent Number: 4,678,320
[45] Date of Patent: Jul. 7, 1987

[54] COPYING MACHINE

[75] Inventor: Yoshihal Fujii, Sakurai, Japan

[73] Assignee: Sharp Kabushiki Kaisha, Osaka, Japan

[21] Appl. No.: 870,385

[22] Filed: Jun. 4, 1986

[30] Foreign Application Priority Data

Jun. 6, 1985 [JP] Japan ................................ 60-123995
Jun. 6, 1985 [JP] Japan ................................ 60-123996

[51] Int. Cl.$^4$ ...................... G03B 27/48; G03B 27/50; G03B 27/70
[52] U.S. Cl. .......................................... 355/49; 355/8
[58] Field of Search .................................. 355/47–49, 355/8, 11

[56] References Cited

U.S. PATENT DOCUMENTS

| 3,652,157 | 3/1972 | Blackert et al. | 355/49 |
| 3,844,653 | 10/1974 | Kelly | 355/49 X |
| 3,997,260 | 12/1976 | Mihalik et al. | 355/49 X |
| 4,400,080 | 8/1983 | Ogawa et al. | 355/49 X |

Primary Examiner—Richard A. Wintercorn
Attorney, Agent, or Firm—Birch, Stewart, Kolasch & Birch

[57] ABSTRACT

A copying machine having an original platform on which an original is placed, an original cylinder around which an original is wound, a photosensitive body on which an image of the original is formed, an original set mechanism for winding a copied paper sheet, produced from the original on the original platform, around the original cylinder, and an optical device. The optical device is provided with a rotatable exposing lamp for applying light from it to either exposure position set on the original platform or on the original cylinder, a rotatable reflecting mirror for further reflecting reflected light at the exposure position, a copying lens for refracting the reflected light on the reflecting mirror towards the photosensitive body and a mechanism for synchronously rotating the exposing lamp and the reflecting mirror, wherein the reflected light at either exposure position on the original platform or on the original cylinder is further reflected by the reflecting mirror onto the optical axis of the copying lens and refracted light through the copying lens is directed towards the photosensitive body to form the image of the original on the photosensitive body in the copying operation.

3 Claims, 7 Drawing Figures

COPYING MACHINE

BACKGROUND OF THE INVENTION

The present invention generally relates to a copying machine and more particularly, to an optical system and a simplified continuous copying operation of a copying machine having an original platform on which an original is placed and an original cylinder around which an original is wound.

Conventionally, when a large number of copied paper sheets are to be produced from one original through operation of a copying machine, it has been a common practice that an original which is placed in position on an original platform has been copied through required times of reciprocating scanning of an optical system or the original platform. In this method, however, since the reciprocating motion of the optical system or the original platform is required for each paper sheet on which the original is copied, the copying machine has been not only relatively slow in copy speed, but also large in vibration, noise or the like.

Meanwhile, there has been commercialized a copying machine having an original cylinder around which the original is wound, wherein the original is copied through the scanning by the rotation of the original cylinder in order to solve the aforementioned drawbacks. In case where a continuous copying operation is carried out on a sheet-like original by the above described copying machine, the optical system is set so that a stationary exposure position is applied with light therefrom and reflected light at the exposure position is transmitted to a photosensitive body, while the original cylinder rotates at the exposure position synchronously with the rotation of the photosensitive body.

In such a copying machine, it is necessary to provide two sets of optical systems such as an optical device for copying the original placed on the original platform and another optical device for copying the original wound around the original cylinder. However, it is not desirable for the copying machine to be provided with two sets of optical devices each having an exposing lamp, one or more reflecting mirrors, a copying lens or the like, since the copying machine tends to be large both in size and weight, high in cost and the like.

Furthermore, in the case where a thick paper, a book or the like is used as the original, since it can not be directly set on the original cylinder for the continuous copying operation, it can not be consecutively copied unless it is once copied on the original platform for the subsequent continuous copying operation wherein a copied paper sheet is set on the original cylinder as the original. Even if the original is not a thick paper sheet, since it is possible that the original may be damaged by the rotation thereof together with the original cylinder, the original has necessarily been first copied on the original platform for the subsequent continuous copying operation wherein the copied paper sheet is wound around the original cylinder as the original, in case of an important original, as well as in case of the thick original described above.

SUMMARY OF THE INVENTION

Accordingly, an essential object of the present invention is to provide an improved copying machine having an optical system which is commonly used in the copying operation for the original on the original platform or for the original wound around the original cylinder.

Another important object of the present invention is to provide a copying machine of the above described type which is capable of automatically and effectively carrying out the continuous copying operation for a thick original.

In accomplishing these and other objects, according to one preferred embodiment of the present invention, there is provided a copying machine having an optical system which includes a rotatable exposing lamp, a rotatable reflecting mirror, a copying lens, a mechanism for synchronously rotating the exposing lamp and the reflecting mirror, or the like, wherein the exposing lamp is arranged so as to apply the light to either an exposure position set on an original platform or on an original cylinder and the reflecting mirror is arranged so as to further reflect the reflected light at either exposure position described above onto the optical axis of the copying lens so that the image of the original is formed on the photosensitive body.

By the above construction of the present invention, the copying operation can be carried out in a manner such that when the original is placed on the original platform to be copied, the exposing lamp is rotated so as to apply light to the exposure position on the original platform and the reflecting mirror is also rotated so as to reflect the reflected light at the exposure position on the original platform onto the optical axis of the copying lens and furthermore, when the original is wound around the original cylinder to be copied, the exposing lamp is rotated so as to apply light to the exposure position on the original cylinder and the reflecting mirror is also rotated so as to reflect the reflected light at the exposure position on the original cylinder onto the optical axis of the copying lens. These rotational movements of the exposing lamp and the reflecting mirror are carried out by the above described mechanism for synchronously rotating them. Thus, even if the copying machine is provided with both the original platform and the original cylinder, the copying operation can be carried out utilizing a single optical system of the copying machine and as a result, a copying machine of small size which is light in weight can be manufactured at low cost.

Moreover, in another aspect of the present invention, the copying machine is further characterized in that it is provided with an original set means for winding a copied paper sheet, copied from the original placed on the original platform, around the original cylinder.

By the above arrangement of the present invention, when the original is copied by setting it on the original platform, a copied paper sheet is directly transported to the original cylinder and is wound therearound. Thereafter, the copied paper sheet can be further copied on the original cylinder, as the original for subsequent copying through scanning of the copied paper sheet by rotation of the original cylinder which is operated by a user or automatically controlled by a control portion of the copying machine. Thus, even if a plurality of copied paper sheets are requested from a thick original or an original which can not be curled, since it is not necessary for the user to carry out two processes as to set the original on the original platform and to wind the copied paper sheet from the original on the original cylinder, the copying operation can be carried out by using the original cylinder through simplified processing of the original and thus resulting in positive and frequent use of the original cylinder. Accordingly, the copying machine of the present invention can reduce vibration thereof and noise therefrom, and can be improved in working efficiency.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
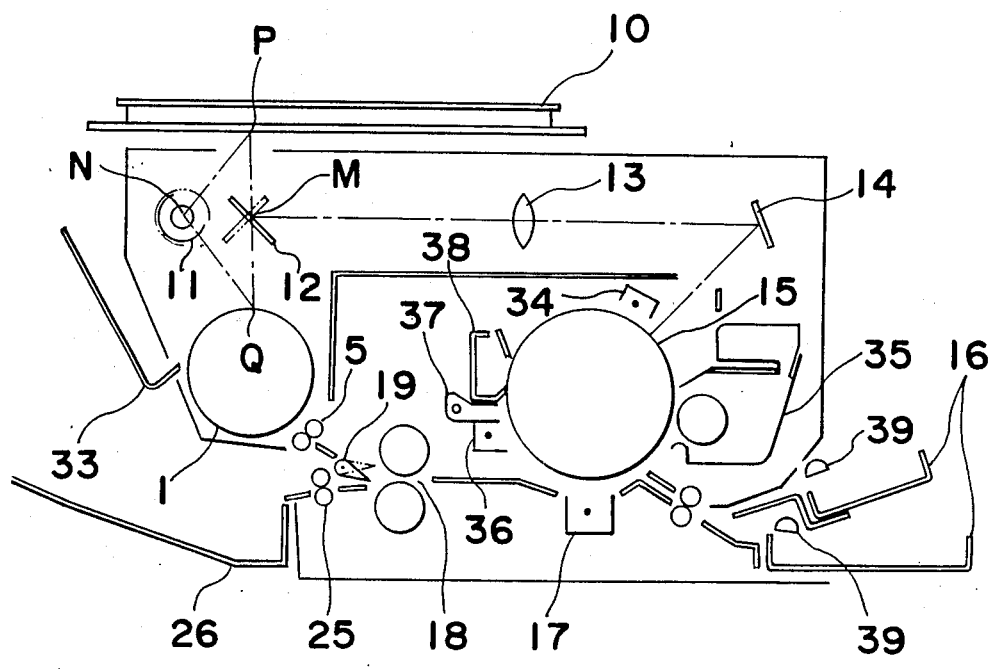
FIG. 1 is a schematic side sectional view showing general construction of a copying machine having an optical device according to one preferred embodiment of the present invention.

Before the description of the present invention proceeds, it is to be noted that like parts are designated by like reference numerals throughout the accompanying drawings.

Referring now to the drawings, there is shown in FIG. 1, a schematic construction of a copying machine according to one preferred embodiment of the present invention. The copying machine is provided with an original platform 10 arranged on the upper surface thereof and a rotatable original cylinder 1 internally arranged at the left side thereof and capable of winding an original therearound as it rotates. The original platform 10 moves from side to side during the copying operation so as to cause an exposure position P to scan the original on the original platform 10, with the exposure position P being stationarily set on a plane including a transparent plate, e.g. a glass plate disposed on the original platform 10. An exposing lamp 11 is disposed at the left side of and under the exposure position P so that reflected light from the exposing lamp 11 is applied on a photosensitive drum 15 through an optical system composed of a first reflecting mirror 12, a copying lens 13 and a second reflecting mirror 14 so as to form an image on the photosensitive drum 15. Light from the exposing lamp 11 is reflected at the exposure position P towards the copying lens 13 on the optical axis thereof through the first reflecting mirror 12 and thereafter the light refracted through the copying lens 13 is applied on the photosensitive drum 15 as the image of the original through the second reflecting mirror.

Meanwhile, both the exposing lamp 11 which applies the light towards the exposure position P and the first reflecting mirror 12 which further reflects the reflected light from the exposure position P on the optical axis of the copying lens 13, are rotatably mounted in the copying machine so as to rotate to the positions as indicated by double dotted chain lines in FIG. 1 in a clockwise direction, while being controlled by a control portion disposed in the copying machine. Since another exposure position Q is set at a position which is symmetric to the exposure position P with respect to the optical axis of the copying lens 13, the exposing lamp 11, which has rotated to the position indicated by the above described double dotted chain line, applies the light on the exposure position Q and the reflected light therefrom is further reflected on the optical axis of the copying lens 13 through the first reflecting mirror 12 which has also rotated to the position indicated by the double dotted chain line. The aforementioned original cylinder 1 is rotatably mounted in the copying machine in a manner that the whole peripheral surface of the original cylinder 1 inevitably crosses the exposure position Q with the rotation thereof. Whereupon, when the rotational axis of the exposing lamp 11 is N and the rotational axis of the first reflecting mirror 12 is M, the line MN is coincident with the optical axis of the copying lens 13 and such relations as $MP = MQ$, $MP \perp MN$ and $MN \perp MQ$ can be obtained.

Furthermore, there are arranged around the photosensitive drum 15, a corona charger 34, a developing device 35, a transfer charger 17, an erasing charger 36, a charge erasing lamp 37 and a cleaner 38 sequentially in the order of the copying process, with the reflected light at the exposure position P or Q being directed onto the photosensitive drum 15 between the corona charger 34 and the developing device 35. A plurality of paper cassettes 16 are detachably inserted into the copying machine at the right and lower side thereof, and a paper feed roller 39 is rotatably mounted above each of the paper cassettes 16. In addition, there is disposed a fixing device 18 at the left and lower side of the copying machine.

The paper feed roller 39 has a function to feed the uppermost one of paper sheets placed on the paper cassette 16 into the copying machine at a predetermined timing in the copying process. The paper sheet which has been red from the paper feed cassette 16 is transported between the photosensitive drum 15 and the transfer charger 17, and receives the transfer of the toner image on the photosensitive drum 15 through corona discharge by the transfer charger 17. Thereafter, the toner image which has been transferred to the paper sheet is fixed by the fixing device 18 and is transported on a paper discharge passage.

A paper discharge guide 19 is arranged on the paper discharge passage so as to be pivotable in a vertical direction. When the paper discharge guide 19 is kept in an upper position, the paper sheet is introduced towards a paper discharge tray 26 which is arranged at the left side of the copying machine, and on the contrary, when the paper discharge guide 19 is kept in a lower position, the paper sheet is introduced towards the original cylinder 1. The above described paper discharge guide 19 is controlled by a control portion (not shown) in the copying machine. There are arranged a pair of guide rollers 5 in the vicinity of the original cylinder 1 for transporting the paper sheet towards the original cylinder 1. A pair of paper discharge rollers 25 are disposed between the paper discharge tray 26 and the paper discharge guide 19 for discharging the paper sheet onto the paper discharge tray 26.

Figure 2A:
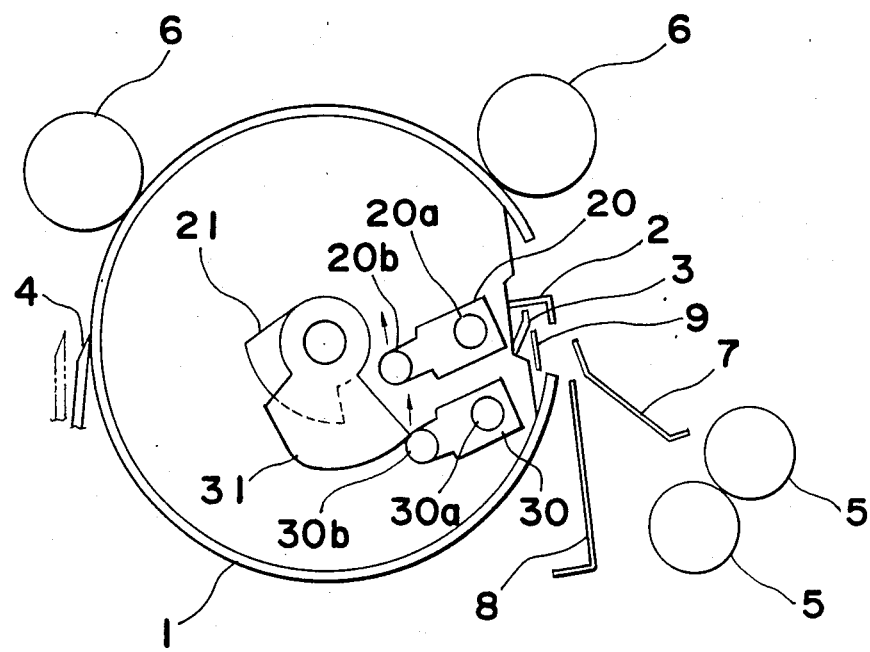
FIGS. 2a and 2b are schematic side sectional views showing constructions of a main portion in the vicinity of an original cylinder arranged in the copying machine of FIG. 1.
Figure 2B:
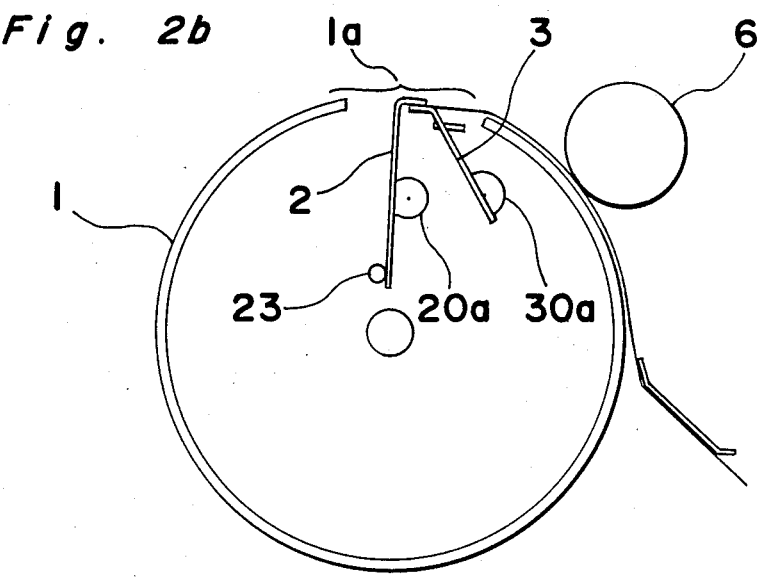

FIGS. 2a and 2b are schematic constructions of the copying machine in the vicinity of the original cylinder 1. The original cylinder 1 is provided with an opening 1a defined thereon in the axial direction thereof and a set of claw pieces 2 and 3 which are arranged outwardly from inside thereof for holding the original. The claw pieces 2 and 3 are rotatably mounted around fulcra 20a and 30a respectively. Furthermore, arm elements 20 and 30 are fixedly mounted on the fulcra 20a and 30a respectively, and each of them is urged by a spring (not shown) in a clockwise direction, as shown by each of the arrows in FIG. 2a. Accordingly, although the claw pieces 2, 3 and the arm elements 20, 30 rotate clockwise, the rotations thereof are limited to the positions where the tip portions 20b and 30b of the arm elements 20 and 30 come in contact with cams 21 and 31 respectively. In FIG. 2a, the claw piece 2 and the arm element 20 are in a position where the clockwise rotation thereof is limited by a stopper 23 which comes in contact with the claw piece 2 at the lower portion thereof. On the other hand, the arm element 30 is in a position where it has rotated inwardly in a direction opposite from the claw piece 2, while restrained by the cam 31. The arm element 30 rotates clockwise, when it disengages from the cam 31 and at this moment, the claw piece 3 moves outwardly so as to come in pressure contact with the claw piece 2 to hold the original therebetween, as shown in FIG. 2b. Meanwhile, although the claw pieces 2, 3, the arm elements 20, 30 and the like rotate in accordance with the rotation of the original cylinder 1, since the cams 21 and 31 do not rotate in accordance therewith, the tip portions 20b and 30b of the arm elements 20 and 30 move along the circumference of the cams 21 and 31 respectively. The cams 21 and 31 are caused to move outwardly in the axial direction of the original cylinder 1 in the course of a continuous copying operation, thus resulting in that the cams 21 and 31 do not engage with the arm elements 20 and 30. That is, only when the original is held by the claw pieces 2, 3 and when the original, which has been already copied, is discharged, the cams 21 and 31 move to the positions where they are in contact with the arm elements 20 and 30. The above described movement of the cams 21 and 31 is controlled by the control portion (not shown) of the copying machine.

When the claw pieces 2 and 3 do not hold the original therebetween, the original cylinder 1 is at a standstill, while the claw pieces 2 and 3 open the holding portions thereof for the original towards the guide rollers 5, as shown in FIG. 2a. When the original is transported by the guide rollers 5 and the leading end thereof comes to a position between the claw pieces 2 and 3, the original cylinder 1 starts to rotate and the arm element 30 disengages from the cam 31. At this instance, the claw piece 3 springs up and the leading end of the original is held by the claw pieces 2 and 3. When the original cylinder 1 rotates while mountaining the aforementioned condition, the original is curved along the outer surface of the original cylinder 1 and each portion of the original crosses the exposure position Q, as shown in FIG. 2b. The cams 21 and 31 do not engage with the arm elements 20 and 30, until the original is discharged after completion of the copying operation.

Upon completion of the copying operation, when the copying machine enters the original discharging process, the cams 21 and 31 move to the positions where they again engage with the arm elements 20 and 30 respectively. At this moment, when the original cylinder 1 rotates by an angle of approximately 180° and comes to a position approximately opposite to the position as shown in FIG. 2a, the tip portion 20a of the arm element 20 engages with the cam 21, thus resulting in that the claw pieces 2 and 3 are released from the pressure contact with each other. Consequently, the original is released from the claw pieces 2 and 3, and an original discharge guide 4, which is arranged in the vicinity of the outer peripheral surface of the original cylinder 1, moves towards the original cylinder 1 so as to contact with the outer surface thereof and thereafter, the original is discharged onto an original discharge tray 33 which is disposed at the left side of the copying machine, with the leading end of the original being guided by the original discharge guide 4.

Figure 3A:
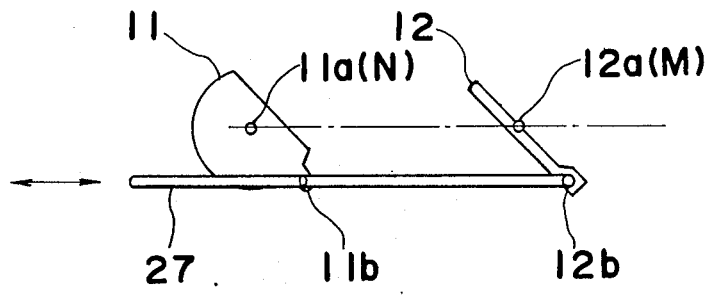
FIGS. 3a and 3b are schematic diagrams showing a state wherein each of an exposing lamp and a first reflecting mirror arranged in the copying machine is directed to an exposure position set on the original platform and a state wherein each of them is directed to an exposure position set on the original cylinder, respectively.
Figure 3B:
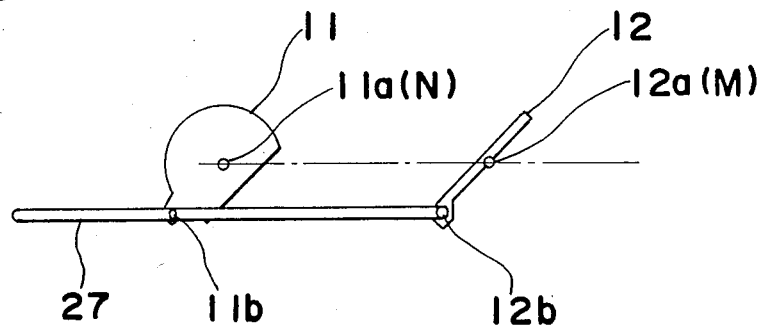

FIGS. 3a and 3b show a rotational mechanism of the exposing lamp 11 and the first reflecting mirror 12. A single dotted chain line in these figures shows the optical axis of the copying lens 13. Both of the exposing lamp 11 and the first reflecting mirror 12 are rotatably mounted around fulcra 11a and 12a respectively, and are provided with crank bearing portions 11b and 12b respectively at the lower ends thereof. A crank 27 is also rotatably mounted both on the crank bearing portions 11b and 12b, with a solenoid (not shown) being connected to the crank 27 and it has a function to move the crank 27 from side to side as shown in FIGS. 3a and 3b through the control by the control portion of the copying machine. FIG. 3a shows a state in which the crank 27 has moved to the right side. In this state, the exposing lamp 11 emits the light towards the exposure position P on the original platform 10 and the reflected light at the exposure position P is further reflected by the first reflecting mirror 12 and directed onto the optical axis of the copying lens 13. Accordingly, the copying operation can be conducted with respect to the original which is set on the original platform 10. That is, the copying operation can be conducted by using the original platform 10. FIG. 3b shows a state in which the crank 27 has moved to the left side. In this state, the exposing lamp 11 emits the light towards the exposure position Q on the original cylinder 1 and the reflected light at the exposure position Q is further reflected by the first reflecting mirror 13 and directed onto the optical axis of the copying lens 13. Accordingly, the copying operation can be conducted in this state with respect to the original which is wound around the original cylinder 1. That is, the copying operation can be conducted by using the original cylinder 1. As stated above in this embodiment, since the distance between the rotational axis N of the exposing lamp 11 and the rotational axis M of the first reflecting mirror 12 is caused to be equal to each of distances between the rotational axis M of the first reflecting mirror 12 and the exposure position P and between the former and the exposure position Q and furthermore, the line MN is perpendicular to the line PQ, each of the exposing lamp 11 and the first reflecting mirror 12 is properly set so that an elevation angle thereof is 45° in case where the original on the exposure position P is applied with the light from the exposing lamp 11, as shown in FIG. 3a, and a depression angle thereof is 45° in case where the original on the exposure position Q is applied with the light, as shown in FIG. 3b. Although the rotations of the exposing lamp 11 and the first reflecting mirror 12 are controlled by the control portion of the copying machine as stated above, this control is automatically conducted through a selection of the copying mode by a user, whether the copying operation is carried out by using the original platform or by using the original cylinder. Meanwhile, since the first reflecting mirror 12 is a surface reflecting type mirror, the rotational axis thereof is set on the surface of the reflected mirror so that its center of reflection does not move through the rotation thereof.

Figure 4:
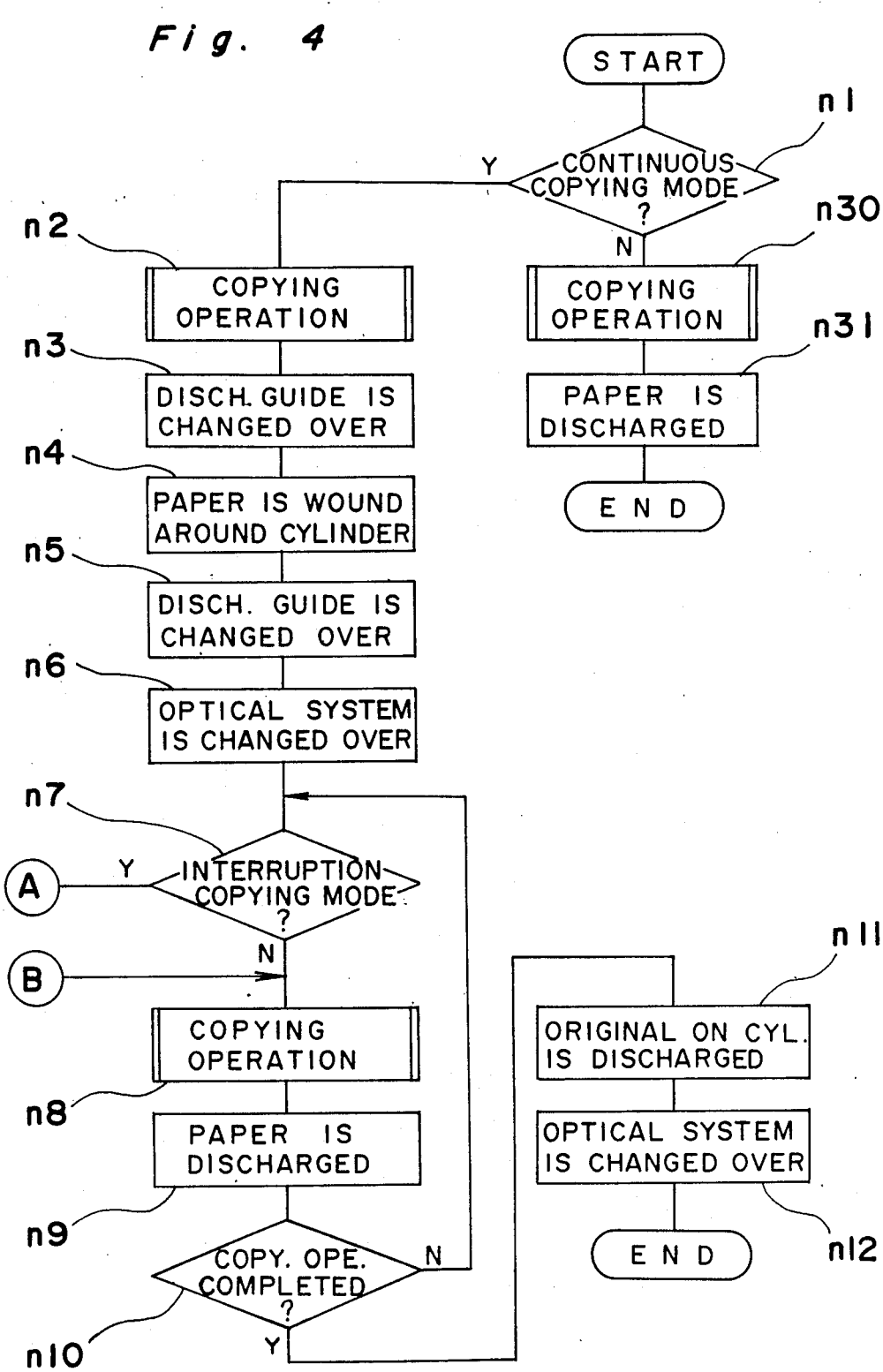
FIG. 4 is a main flow-chart for explaining functions of a control portion of the copying machine of FIG. 1.
Figure 5:
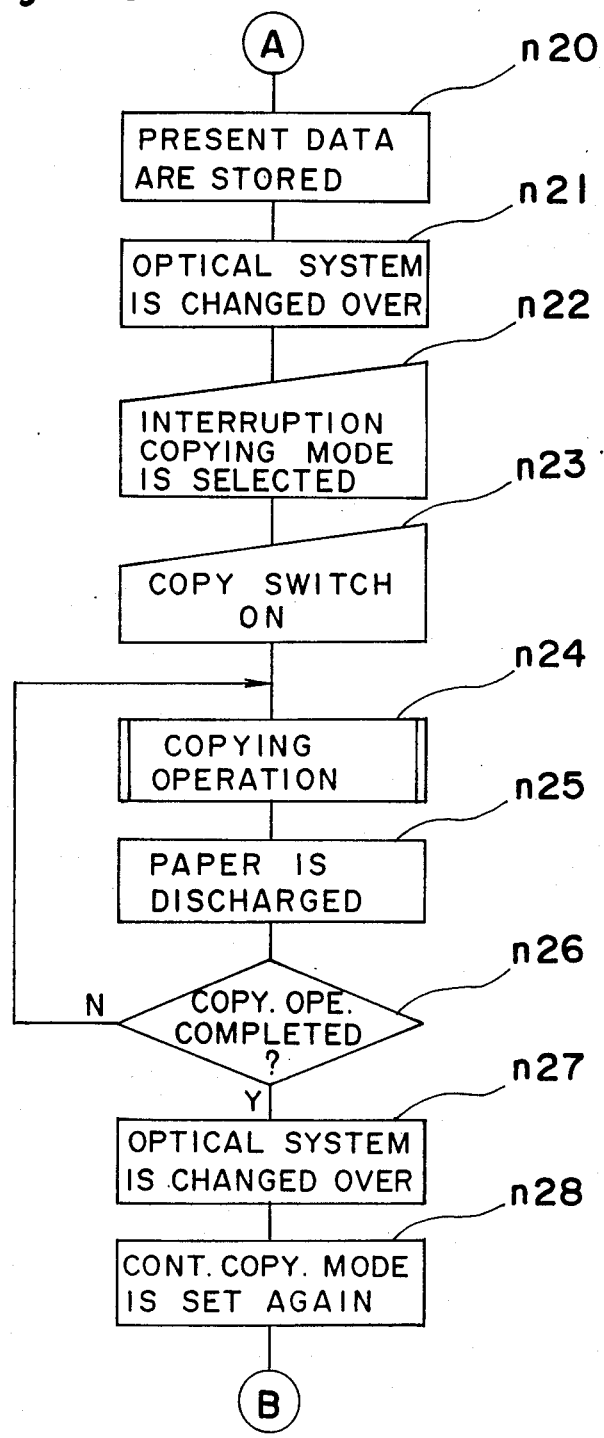
FIG. 5 is a side flow-chart between (A) and (B) in the main flow-chart of FIG. 4.

Referring further to FIGS. 4 and 5, there is shown a flow-chart for explaining functions of the control portion of the copying machine according to the present invention.

In FIG. 4, upon depression of a copy switch arranged on an operation panel, it is judged at step n1 whether or not the copying machine is in continuous copying mode. When the copying machine is not in continuous copying mode, an ordinary copying operation is carried out at step n30 and the copying machine is brought to a standstill after a copied paper sheet has been discharged onto the paper discharge tray 26 at step n31.

When the copying machine is in continuous copying mode, the procedure proceeds to step n2 from which the continuous copying operation starts. In the first place, the original placed on the original platform 10 is copied at step n2 through ordinary copying process wherein the original platform 10 is used. At step n3, the paper discharge guide 19 is changed over to the side of the original cylinder 1 and at step n4, a copied paper sheet is transported to the original cylinder 1 and wound therearound as the original for subsequent continuous copying operation. Thereafter, the paper discharge guide 19 is changed over again to the side of the paper discharge tray 26 at step n5 and thus, the optical system is also changed over at step n6 so as to scan the original on the original cylinder 1 as shown in FIG. 3b. At step n7, it is judged whether or not the copying machine is set in interruption copying mode for copying another original on the original platform 10. When the copying machine is not set in interruption copying mode, the original on the original cylinder 1 is copied through copying process at step n8 and a copied paper sheet is discharged onto the paper discharge tray 26 at step n9. Furthermore, the procedure repeats a series of process from step n7 to n10, until it is judged at step n10 that the copying operation has been completed for the required number of paper sheets to be copied. When it is judged that the copying operation has been completed for the required number of paper sheets to be copied at step n10, the original wound around the original cylinder 1 is discharged at step n11 and the optical system is further changed over at step n12 so as to scan the original on the original platform 10 as shown in FIG. 3a, and thus resulting in the completion of the copying operation. The aforementioned copying operation in interruption mode is inputted by depressing an interruption key arranged on the operation panel after the original has been placed in position on the original platform 10.

A process in the case where it is judged that the copying machine is in interruption mode will be explained hereinafter with reference to FIG. 5. When it is judged that the interruption mode has been selected at step n7, the procedure directly proceeds to step n20 and at this step, such data of the present continuous copying operation as remaining number of paper sheets to be copied, image density and the like are stored. At subsequent step n21, the optical system is changed over to the side of the original platform 10. Furthermore, when the interruption copying mode is set by the user at step n22 and the copy switch is turned on at step n23, the copying operation is carried out on the original placed on the original platform 10 at step n24 and the copied paper sheet is discharged onto the paper discharge tray 26 at step n25. The procedure repeats a series of process from step n24 to step n26 until it is judged at step n26 the copying operation has been carried out for the required number of the paper sheets to be copied. When the required number of the copied paper sheet has been obtained through the above described copying operation, the optical system is again changed over to the side of the original cylinder 1 at step n27 and the procedure returns to step n8 after the mode in the course of the continuous copying operation, the data of which mode have been stored at step 20, is set again at step n28.

As described so far, according to the copying machine of the present invention, in the case where the copying operation is carried out by using the original platform, the exposing lamp and the first reflecting mirror rotate so that the original on the original platform is exposed to the light at the exposure position set thereon so as to form its image on the photosensitive drum. On the contrary, in the case where the copying operation is carried out by using the original cylinder, the exposing lamp and the first reflecting mirror rotate in a direction opposite to the direction described above so that the original on the original cylinder is exposed to the light at the exposure position set thereon so as to form its image on the photosensitive drum. These rotational movements of the exposing lamp and the first reflecting mirror are automatically carried out by the control portion of the copying machine through operation of the operation panel, the set of the interruption copying mode and the like by the user. Accordingly, each original on the original platform or on the original cylinder can be copied by the copying machine of the present invention having a single optical device.

Moreover, when the continuous copying operation is carried out by the copying machine of the present invention, upon commencement thereof by setting the original on the original platform, the original is copied through an ordinary copying process and a copied paper sheet is wound around the original cylinder as the original for subsequent copying through rotation of the original cylinder. Thus, since the continuous copying operation can be carried out by substantially eliminating such a time consuming factor as winding the original around the original cylinder, the copying machine can be improved in working efficiency thereof. In addition, when the copying operation is requested in interruption mode in the course of the continuous copying process by using the original cylinder, the copying operation can be easily carried out by setting the original on the original platform and as a result, since it is not necessary to remove the original in the course of the continuous copying process or to set it again, the copying machine can be also improved in working efficiency thereof in the interruption copying operation.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A copying machine comprising an original platform on which an original is placed, an original cylinder around which an original is wound, a photosensitive body on which an image of the original is formed and an optical device, said optical device comprising:

a source of light rotatably mounted in said copying machine for applying light therefrom to either of an exposure position set on said original platform or on said original cylinder;

a reflecting mirror rotatably mounted in said copying machine for further reflecting reflected light at said respective exposure positions;

a copying lens for refracting the reflected light from said reflecting mirror towards said photosensitive body; and means for synchronously rotating said source of light and said reflecting mirror, wherein the reflected light at either exposure position on said original platform or on said original cylinder is further reflected by said reflecting mirror onto the optical axis of said copying lens and refracted light therethrough is directed towards said photosensitive body to form the image of the original thereon in the copying operation.

2. A copying machine which comprises:

an original platform on which an original is placed;

an original cylinder around which an original is wound;

a photosensitive body on which an image of the original is formed; and means for winding a copied paper sheet around said original cylinder for a subsequent continuous copying operation after the original placed on said original platform has been copied, wherein the original set on either of said original platform or said original cylinder is exposed with light so as to form its image on said photosensitive body through scanning of the original.

3. The copying machine of claim 2, further including an optical device comprising:

a source of light rotatably mounted in said copying machine for applying light therefrom to either of an exposure position set on said original platform or on said original cylinder;

a reflecting mirror rotatably mounted in said copying machine for further reflecting reflected light at said respective exposure positions;

a copying lens for refracting the reflected light from said reflecting mirror towards said photosensitive body; and means for synchronously rotating said source of light and said reflecting mirror, wherein the reflected light at either exposure position on said original platform or on said original cylinder is further reflected by said reflecting mirror onto the optical axis of said copying lens and refracted light therethrough is directed towards said photosensitive body to form the image of the original thereon in the copying operation.

* * * * *